No. 650,389. Patented May 29, 1900.
C. B. HATFIELD.
TAPE MEASURING DEVICE.
(Application filed June 28, 1899.)
(No Model.)
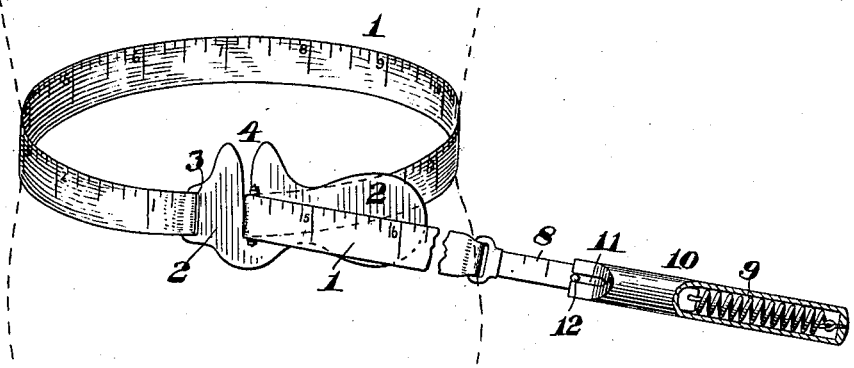
Fig. 1.
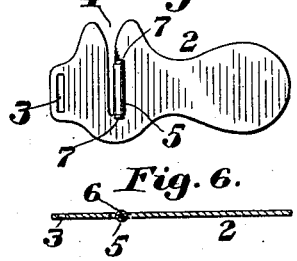
Fig. 3.
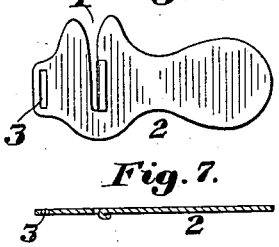
Fig. 4.
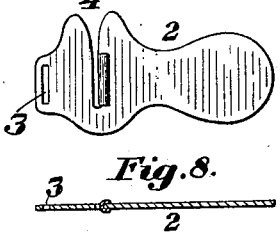
Fig. 5.
Fig. 6. Fig. 7. Fig. 8.
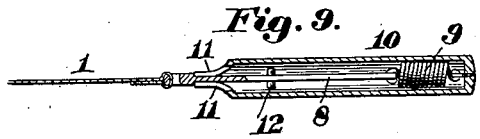
Fig. 2.
Fig. 9.
Witnesses:
Walter E. Lombard
Charles B. Choate.
Inventor:
Charles B. Hatfield,
by N. C. Lombard
Atty.
THE NORRIS PETERS CO., PHOTO-LITHO., WASHINGTON, D. C.

UNITED STATES PATENT OFFICE.

CHARLES B. HATFIELD, OF BOSTON, MASSACHUSETTS, ASSIGNOR OF TWO-THIRDS TO DAVID H. McCONNELL AND ARTHUR S. HOYT, OF NEW YORK, N. Y.

TAPE-MEASURING DEVICE.

SPECIFICATION forming part of Letters Patent No. 650,389, dated May 29, 1900.

Application filed June 28, 1899. Serial No. 722,107. (No model.)

*To all whom it may concern:*

Be it known that I, CHARLES B. HATFIELD, of Boston, in the county of Suffolk and State of Massachusetts, have invented certain new and useful Improvements in Tape-Measuring Devices, of which the following, taken in connection with the accompanying drawings, is a specification.

The present invention relates to measures, and more particularly to that class of flexible measures used for obtaining circumferential measurements of soft or yielding objects, such as the human foot or body.

The object of my invention is to provide such flexible measures with a tension-indicating device which shall indicate to the operator when a certain predetermined tension has been applied to the measure, and thus enable him or others to make the various measurements under the same amount of tension.

To the above end my invention consists in the devices and combinations hereinafter described, and more particularly set forth in the claims.

In the illustrated embodiment of my invention, Figure 1 is a perspective view of my improved tape-measure in operation, the proper amount of tension having been applied. Fig. 2 is a front elevation of the straining clip or plate. Figs. 3, 4, and 5 are modifications of the same. Figs. 6, 7, and 8 are sectional views of the modified forms, and Fig. 9 is a sectional view of the tension device in its normal or retracted position.

In my improved tape-measure a graduated measure 1, which may be of any suitable flexible material and of any desired dimensions, is provided at one end, preferably the initial end, with a clip or plate 2. This may be attached by passing the end of the measure 1 through the closed slot 3 in the plate 2 and turning it back upon itself and securing it thereto by stitches or in any other suitable manner. The plate 2 is provided with an open slot 4, the side farthest from the slot 3 being perpendicular to the longitudinal axis of said plate. This slot is so positioned with regard to the connection of said plate with the measure that its perpendicular side will form the initial point of the graduated measure, and thus allow the operator to read the measure directly where it passes through said slot without the need of correction. If preferred, this side of the slot 4 may be provided with a roller-bearing surface consisting of a roller 5, rotatably mounted upon a pin 7, as shown in Figs. 3 and 6, in order that the whole tension applied may be effective in drawing the measure around the object to be measured. A simpler construction is shown in Figs. 4, 5, 7, and 8, where a rounded bearing-surface on one or both sides is depicted.

While not limiting myself to any particular form or shape of straining-plate, I prefer to so construct it that it may be readily grasped and held by the hand of the operator, and in the illustrated embodiment of my invention I have shown a plate provided with a finger-clip. To the other end of the measure 1 is secured the tension-indicator, which in the device of the drawings comprises a graduated tension-bar 8, casing 10, and spring 9. The bar 8 may be of any desired shape or dimensions, that of the drawings being rectangular in cross-section, and said bar enters the casing 10, which is preferably of cylindrical shape, through a slot in one end of the casing of a shape corresponding to the bar. Secured to the inner end of said bar 8 is the spring 9, the other end of which is attached to the end of the casing 10. Any pull exerted upon the casing 10 will be transmitted through the spring 9 and bar 8 to the measure 1, the bar being drawn out through its slot a distance corresponding to the force applied. In order to avoid the necessity of the operator looking at the bar 8 of the tension-indicator to see if the proper amount of tension has been applied, I have provided the bar 12 with an indicator-point, which in the form illustrated consists of a pin, which may pass through longitudinal slots 11 in the end of the casing 10.

I prefer to taper the end of the casing as shown in Figs. 1 and 9, providing rests for the thumb or finger of the operator, which rests enable the thumb or finger to be placed in the path of movement of the indicator-point 12 and to be engaged thereby when the bar is drawn out, so that by the sense of touch alone he may know that the measure is under the proper tension.

The operation of my device is as follows: The end clip or plate 2 is held in the left hand of the operator, who with his right passes the measure 1 around the object to be measured and inserts it in the slot 4. Taking the tension device now in his right hand with his thumb on the thumb-rest, he draws upon the tape until he feels the pin 12, when he reads the measure. By the use of my improved indicator, which comes in contact with the thumb or finger, much more accurate measurements will be made and in a less time than if the operator has to rely upon his eyes to read the tension-indicator and the tape-measure at the same time.

I am aware that tape-measures have been used in connection with spring tension-indicating devices; but so far as I know I am the first to combine with a tape-measure a tension-indicator which will inform the operator when a proper amount of tension has been applied simply by contact with the finger or thumb.

Having fully described my invention, I claim as new and desire to secure by Letters Patent of the United States—

1. In a measuring device, the combination with a flexible graduated measure, of a tension-indicator attached to one end thereof, said indicator comprising a member to be grasped by the hand provided with a thumb-rest, and a member yieldingly connected therewith provided with an indicator-point arranged to pass the thumb-rest and contact with the thumb of the operator and indicate the tension or pull applied to the flexible measure, substantially as described.

2. In a measuring device, the combination with a flexible graduated measure, of a tension-indicator attached to one end thereof, said indicator comprising a casing to be grasped by the hand provided with a bar yieldingly connected therewith, said bar having indicator-points normally sustained within said casing and arranged to be withdrawn and to contact with the thumb or finger of the operator to indicate the tension or pull applied to the flexible measure, substantially as described.

3. The combination with a flexible measure, of a plate secured to one end thereof, a slot in said plate to receive the measure intermediate its ends, a tension-indicator attached to the other end of said measure, said indicator comprising a casing to be grasped by the hand, provided with a bar yieldingly connected therewith, said bar having indicator-points normally sustained within said casing and arranged to be withdrawn and to contact with the thumb or finger of the operator to indicate the pull or tension applied to the flexible measure, substantially as described.

In testimony whereof I have signed my name to this specification, in the presence of two subscribing witnesses, on this 10th day of June, A. D. 1899.

CHARLES B. HATFIELD.

Witnesses:
N. C. LOMBARD,
CHARLES B. HATFIELD, Jr.